(No Model.)

T. COGSWELL.
FRUIT OR VEGETABLE BASKET OR RECEPTACLE.

No. 508,408. Patented Nov. 14, 1893.

Witnesses
Will T. Norton
Geo. H. Brown Jr.

Inventor
Thomas Cogswell
By his Attorney.

THE NATIONAL LITHOGRAPHING COMPANY,
WASHINGTON, D. C.

UNITED STATES PATENT OFFICE.

THOMAS COGSWELL, OF SAN DIEGO, CALIFORNIA.

FRUIT OR VEGETABLE BASKET OR RECEPTACLE.

SPECIFICATION forming part of Letters Patent No. 508,408, dated November 14, 1893.

Application filed June 24, 1892. Serial No. 437,879. (No model.)

*To all whom it may concern:*

Be it known that I, THOMAS COGSWELL, a citizen of the United States, and a resident of the city and county of San Diego, State of California, have invented a new and useful Fruit or Vegetable Basket or Receptacle for General Use; and I hereby declare that the following is a full, clear, and exact description of my invention, such as will enable others skilled in the art to which it appertains to make and use the same.

My invention relates to a novel and useful fruit or vegetable basket or receptacle for general use, constructed of wood or other suitable material, and of any size and form hereinafter more fully described.

The following description fully explains the nature of my said invention, and the manner in which I proceed to construct, apply and use the same.

Figure 1:
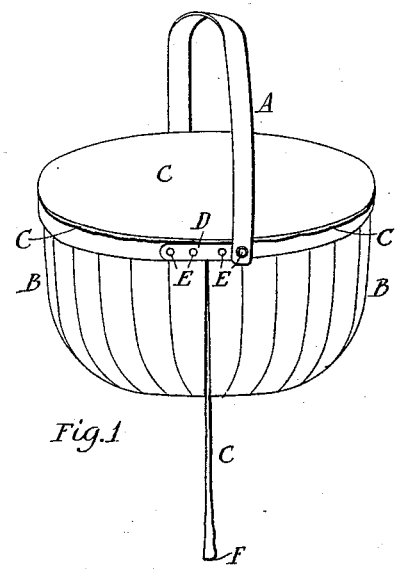
Figure 2:
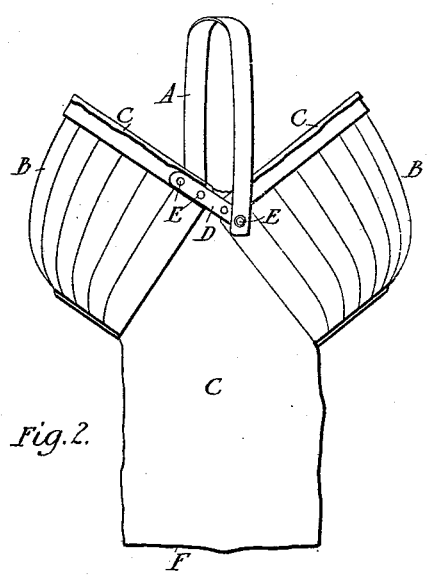
Figure 3:
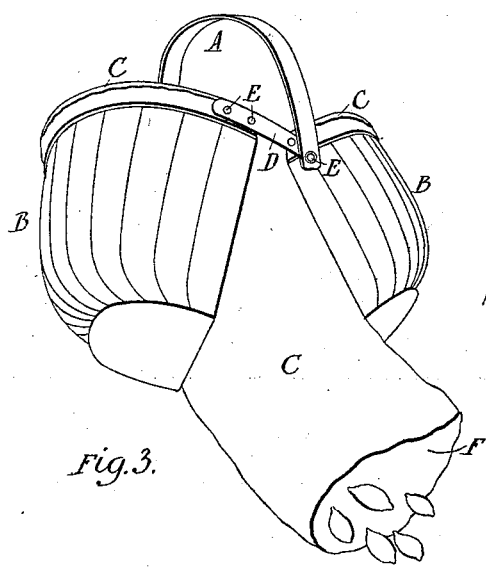
Figure 4:
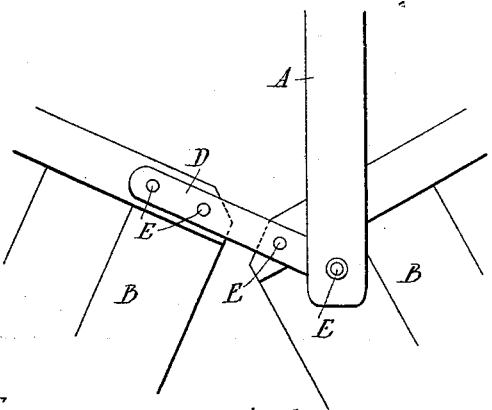

Figure 1., is a perspective view of the fruit or vegetable basket or receptacle, in position for receiving fruit or vegetables, showing the sack secured to the rim of same at the top, and extending down through the bottom of basket. Fig. 2., is a perspective side view of the basket, showing its position when releasing its contents. Fig. 3., is a perspective view, showing the bottom of basket, when releasing the contents, holding the sack in a straight position. Fig. 4., represents a riveted hinge, attached at top edge of basket on both sides, which secures the two parts of the basket together, and having the handle secured to same.

The letters of reference indicate corresponding parts in all the figures.

Referring to the several parts by letter, "A" indicates the handle of the basket; "B" the two parts of the basket constructed of wood or other suitable material, as shown, and secured at the top edge on the rim of same by hinge "D," formed out of two metal plates for both sides of basket "B. B." Two of these plates constituting the hinge "D" are placed on the inside top edges, extending from one half of the basket to the other, where they come together; in the same manner are placed two other plates at the same point of contact, but on the outside part of the top rim. These two outside plates being longer by one inch or more for the purpose of securing the handle of the basket "B. B." pivotally as shown. The left end of the hinge "D" is secured to that half of basket "B" by two rivets, "E," while the right end of hinge "D" has but one rivet, "E," allowing suitable extension of these outside plates of hinge "D" to pivotally attach the handle "A." It will thus be seen, that the lifting of the basket by the handle will close the bottom of same firmly; and that the greater the weight of contents, the more firmly it will keep closed until said contents are to be released, which is always accomplished through the bottom. When the basket "B. B." is thus constructed, a sack "C" made of any suitable fabric, and of any suitable length, is adjustably secured at the top rim of the basket, for the purpose of forming a cushion for the contents, and thus preventing the bruising of the same.

I do not confine myself to the sack "C," as my basket may be used without the sack. Neither do I confine myself to the special manufacture of the basket "B. B." as constructed, as any basket or receptacle used now for that purpose may answer, by cutting such basket or bucket in two parts, attaching a hinge "D," and any suitable sack "C," as shown for the purpose set forth.

I desire to lay special claim to cutting in two parts any suitable basket, bucket or receptacle, now in use, for any purpose, and applying my devices for preventing the bruising of fruit and like products, which consist of hinging the two parts at the top of rim, and attaching any suitable sack in an adjustable manner, for the purposes herein set forth.

Having thus fully described my invention, what I claim, and desire to secure by Letters Patent, is—

1. In a basket, the combination with the body formed or cut in two parts, of hinge levers at the junction of the parts, and the handle secured to the free ends of said levers and operating as described.

2. In a basket, the combination with the body formed or cut in two parts, of hinge levers each of which is fixedly secured at one end to one of the parts and pivotally secured at its other end to the other part, and a handle secured to the pivotal ends of the levers, and operating as described.

3. A fruit or vegetable basket, formed in two parts, hinged together at the top, and having a sack with an open bottom secured to the top of the rim, and hanging loosely through the same, for the purposes set forth.

4. A basket of the class described comprising in combination the two parts hinged at their tops, the hinge plates, the handle connecting such plates, the sack having an open bottom secured to the rim, and hanging loosely through the basket for the purposes set forth.

In witness whereof I have hereunto set my hand.

THOMAS COGSWELL.

Witnesses:
A. B. SMITH,
C. F. KIRBY.